United States Patent [19]
Sharp

[11] 3,801,161
[45] Apr. 2, 1974

[54] ANTI-LOCK VEHICLE BRAKE SYSTEM

[75] Inventor: Denis Sharp, Grinstead, England

[73] Assignee: U.S, Philips Corporation, New York, N.Y.

[22] Filed: July 26, 1972

[21] Appl. No.: 275,365

[30] Foreign Application Priority Data
Aug. 9, 1971   Great Britain..................... 37353/71

[52] U.S. Cl............... 303/21 F, 188/181 A, 303/10
[51] Int. Cl............................................... B60t 8/12
[58] Field of Search......................... 303/21, 61–63, 303/68–69, 10, 6, 84 R; 188/181

[56] References Cited
UNITED STATES PATENTS
3,443,594   5/1969   Frayer................................ 303/21 F
3,524,684   8/1970   Skoyles............................... 303/21 F
3,708,213   1/1973   Skoyles............................... 303/21 F

*Primary Examiner*—Duane A. Reger
*Assistant Examiner*—D. C. Butler
*Attorney, Agent, or Firm*—Frank R. Trifari

[57] ABSTRACT

An anti-lock braking system for prevention of dangerous skids, providing for relieving brake pressure when the wheel of the vehicle tends to lock, and then increasing the brake pressure without having to apply the brake. The brake pressure increase is performed at an increasing rate relative to a reference value of pressure.

10 Claims, 2 Drawing Figures

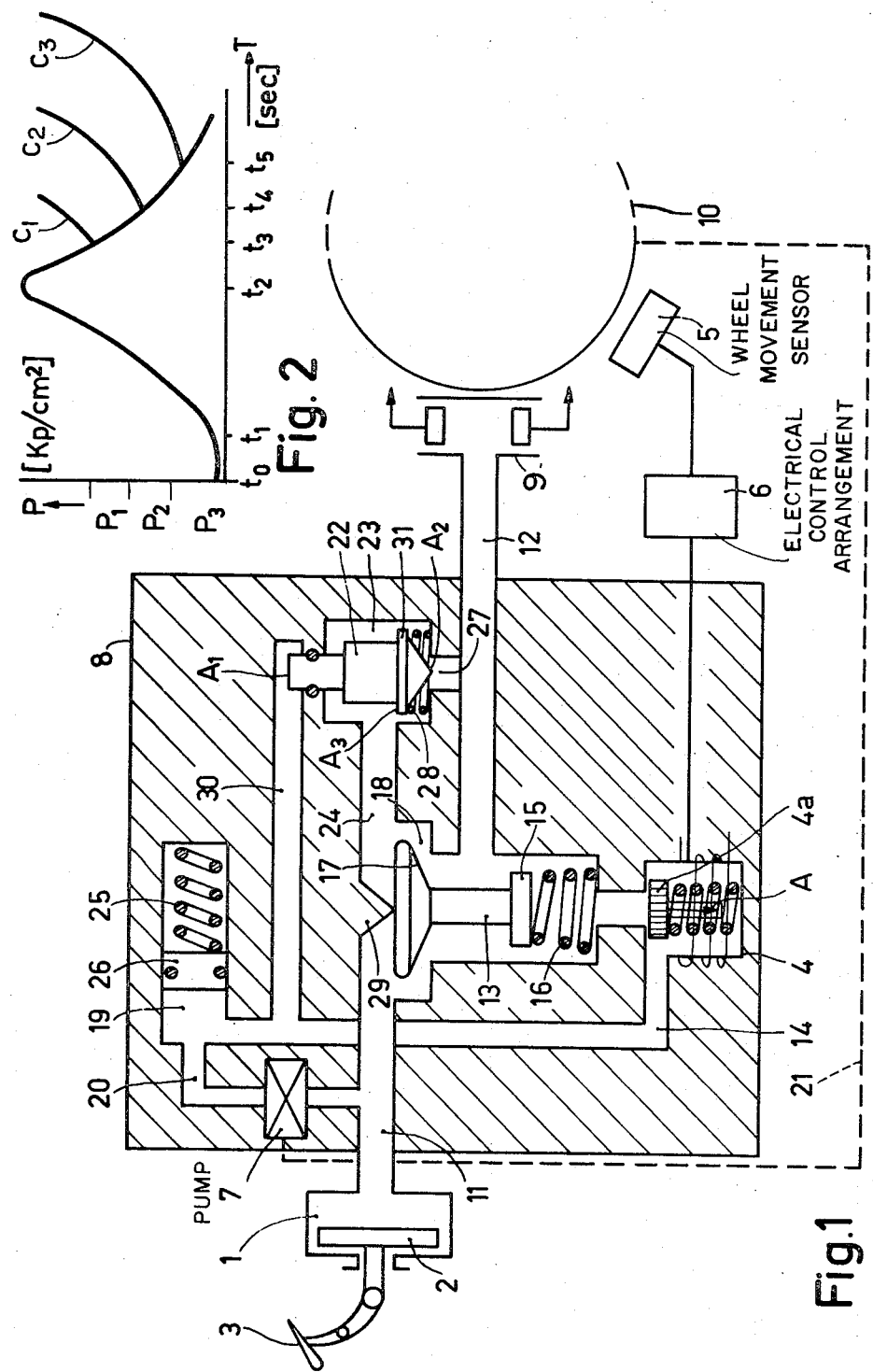

ANTI-LOCK VEHICLE BRAKE SYSTEM

This invention relates to anti-lock brake systems for wheeled vehicles, that is, brake systems including means for improving braking performance of a vehicle by relieving braking pressure applied to a road wheel of the vehicle, if the wheel tends to lock following brake application, and then increasing the braking pressure again without the need for any change in the actual braking action (by a person using the brake) causing the brake application. Such brake systems can be successful in reducing the risk of skidding due to wheel lock, maintaining directional control during braking, and reducing braking distances.

The invention, comprises a fluid pressure source which in response to a braking section, provides fluid under pressure via a fluid pressure connection to the brake. The fluid under pressure is effective to cause the brake to produce braking pressure at the wheel. A control circuit is provided which is responsive to an electrical input from a wheel movement sensor, to produce an electrical output to energize a solenoid valve mechanism, when a particular criterion related to wheel rotational movement obtains. A relief connection, interconnected with said fluid pressure connection or with the brake, is adapted to be opened by said solenoid valve mechanism, when the latter is energized, to allow displacement of fluid from said fluid pressure connection or from the brake into said relief connection. This causes a reduction in the pressure of such fluid and thereby relieves the braking pressure. The aforementioned criterion may typically be one in which, for example, the wheel deceleration is in excess of a predetermined value.

An anti-lock vehicle brake system of the above character may be either of the master cylinder type, in which fluid in a master cylinder is pressurized by a piston when a braking action takes place in order to pressurize fluid in said fluid pressure connection, or of the continuously pumped type, in which fluid under pressure is available continuously in the brake system, and is "modulated" by braking action such that the pressurized fluid is applied through said fluid pressure connection to the brake to an extent determined by the extent of modulation. Also, the braking action may be with or without servo or amplifier assistance. The term "fluid pressure source" as used hereinafter, is to be construed in view of the above teachings.

In an anti-lock vehicle brake system of the above character, the solenoid valve mechanism remains energized to cause braking pressure to be relieved for what will be termed an "anti-lock" period. The valve is de-energized at the end of this period to allow braking pressure to increase again. This operation, which causes the alternate decrease and increase of the braking pressure, is repeated in successive anti-lock periods each time the wheel tends towards a locked condition that could result in skidding during a braking action.

The volume of fluid displaced through said relief connection each time the solenoid valve mechanism is energized has to be sufficient to relieve braking pressure. If braking takes place on a slippery surface, (i.e., a surface affording poor tire adhesion) then braking pressure will have to be reduced to a lower value in order for the braked wheel to recover, than if braking takes place on a good surface (i.e., a surface afforing good tire adhesion). Furthermore, it seems desirable for optimum performance, that once the solenoid valve mechanism is de-energized at the end of an anti-lock period, the braking pressure should be increased again to its original value as quickly as possible. However, it has been found in practice, that optimum performance is not necessarily obtained by providing a high rate of increase of braking pressure in order to bring it back to its original value following the de-energization of the solenoid valve mechanism. The reason for this may be explained as follows: If braking takes place on a slippery surface, then it is likely that a driver will have braked too severely. Therefore, the value of braking pressure which obtains when an anti-lock period is initiated, is far in excess of the locking value (i.e., a value at which there is a tendency for the wheel to lock) for that particular surface. Consequently, an anti-lock system should allow restoration of braking pressure only back to some lesser value which is approaching the locking value for the slippery surface, and then indicate a further anti-lock operation. However, if the braking pressure is restored at as high a rate as possible then there is the likelihood that it will appreciably overshoot the locking value and approach the subsisting original value (e.g., current master cylinder pressure as determined by the driver). This will occur before the system can overcome its inertia and recover sufficiently enough to re-energize the solenoid valve mechanism causing the braking pressure to be relieved again.

On the other hand, if braking takes place on a good surface then it is likely that braking will not be too severe. Consequently, the locking value will not be much different from the subsisting original value. Therefore, braking pressure can be restored to the locking valve as quickly as possible at the end of an anti-lock period without any appreciable over-shooting.

Therefore, it will be appreciated that the performance of an anti-lock vehicle brake system of the above character can be improved by controlling the rate of increase of braking pressure, following the de-energization of the solenoid value mechanism at the end of each anti-lock period, so that it varies from a high rate to a low rate in accordance with variation of the co-efficient of friction ($\mu$) between a surface and a vehicle wheel from high to low $\mu$ valves.

It is an object of the present invention to provide a means for achieving such a control.

According to the present invention, an anti-lock vehicle brake system of the character referred to includes an unbalanced valve. The valve is located at the junction of said fluid pressure connection (or brake) and said relief connection, and is displaceable by flow of fluid from the brake into said relief connection, upon energization of the solenoid valve mechanism, to close the fluid pressure connection between the fluid pressure source and the brake. The unbalanced valve is adapted to remain closed following subsequent de-energization of the solenoid value mechanism, until the pressure of fluid at the brake side of this valve increases to a predetermined value relative to the value of the pressure of fluid at the fluid pressure source side thereof. This increase of fluid pressure, and thus the increase of braking pressure, is at a rate controlled by a control valve through which fluid from the fluid pressure source by-passes the unbalanced valve to reach the brake, and which is adapted to progressively increase this rate as the value of braking pressure increases relative to a reference value of pressure.

In carrying out the invention, said reference value of pressure can be atmospheric pressure. Alternatively and preferably, said reference value of pressure is pressure of fluid in a reservoir into which fluid displaced through said relief connection passes, when the solenoid valve mechanism is energized. In a particular form of anti-lock vehicle brake system to be described to exemplify the invention, this reservoir fluid is returned continually by means of a pump to the fluid pressure source of the system, so that this reservoir fluid pressure is maintained at a relatively low value compared with the value of fluid pressure at the brake, during braking.

In a preferred embodiment of the invention, said control valve comprises a flow measuring piston which is subjected to flow of fluid which by-passes the unbalanced valve to reach the brake. The control valve is displaceable towards a fully closed position (in which it would stem this flow of fluid) by a force exerted in it by said reference value of pressure, and by the force exerted on its flow measuring piston by this flow of fluid. The control valve is also displaceable towards a fully open position (in which it permits maximum rate of low of fluid) by the force exerted on its flow measuring piston by the pressure of fluid at the brake. The arrangement is such that as the pressure of fluid at the brake increases, the increasing force exerted by this pressure progressively displaces the control valve towards its fully open position, with the result that said flow of fluid progressively increases to produce a progressively increasing balancing force, whereby the rate of increase of braking pressure as caused by the increasing fluid flow is dependent on the value of braking pressure and independent of the value of fluid pressure at the fluid pressure source, when this latter pressure is greater than the braking pressure.

The control valve can be located for its displacement in a chamber with a gap between the chamber wall and the flow measuring piston, to permit passage of said flow of fluid past the flow measuring piston. Alternatively, with the control valve located for its displacement in a chamber, its flow measuring piston can be formed with a hole or holes which permit(s) passage of said flow of fluid through it, or a by-pass connection separate from the chamber but communicating with the latter on opposite sides of the piston can be provided.

Said unbalanced valve is preferably spring-biased for displacement towards an open position to an extent which is suficient to hold it open when the solenoid valve mechanism is un-energized, but which is insufficient to maintain it open against a force exterted on a piston of the unbalanced valve by a pressure drop produced across this piston due to said flow of fluid past the latter into said relief connection. The spring-biassing of the unbalanced valve is also such, that its force is sufficient to re-open the unbalanced valve only when the fluid pressure at its brake side has increased to almost the value of fluid pressure at its fluid pressure source side.

In order that the invention may be more fully understood reference will now be made by way of example to the accompanying drawing:

FIG. 1 shows diagrammatically an anti-lock vehicle brake system of the invention; and FIG. 2 shows a graph representing braking pressure versus time.

Referring to FIG. 1 the drawing, the anti-lock vehicle brake system there shown is a master cylinder type hydraulic system comprising a master cylinder 1 having a piston 2 which is actuable by a brake pedal 3. The system further comprises a solenoid valve mechanism 4, a wheel movement sensor 5, an electrical control arrangement 6, a scavenging pump 7 and an anti-lock control unit 8 (of which the solenoid valve mechanism 4 and pump 7 form part). A vehicle brake 9 for a wheel 10 is controlled by the system.

In operation of the system for normal brake application, fluid in pressure connections 11 and 12 is pressurized by the master cylinder 1 to an extent determined by a driver's braking action, and this produces a corresponding braking pressure in the brake 9. An unbalanced valve 13 in the unit 8 is open at this time, so that there is an unrestricted fluid connection through the unit 8 between the pressure connections 11 and 12. However, if the driver's braking action is likely to cause skidding due to wheel locking, this is detected by the wheel movement sensor 5 and the electrical control arrangement 6, and the solenoid valve mechanism 4 is energized. Details of the manner of the operation and the composition of the elements 4, 5 and 6 are not thought to be necessary for an understanding of the present invention, but an example is given in co-pending U.S. Pat. on which U.S. Pat. No. 3,710,186 was issued on Jan. 9, 1973 Application Ser. No. 884,551, filed Dec. 12, 1969.

As a result of the energization of the solenoid valve mechanism 4, a valve 4a thereof is opened by displacement in the direction indicated by the arrow A, and fluid under pressure in the pressure connection 12 (and in connection 11) is displaced from the brake into a relief connection 11, so that braking is relieved. The flow of displaced fluid past a piston portion 15 of the unbalanced valve 13, causes a small pressure drop across this portion. The force due to this pressure drop pushes the unbalanced valve 13 downwards (as seen in the drawing) against the force exerted by a spring 16, so that a seal portion 17 of the unbalanced valve 13 closes an opening 18, and thereby seals off the pressure connection 11 from the pressure connection 12 and the relief connection 14. This prevents further loss of fluid from the master cylinder 1.

Braking pressure will continue to fall as long as the solenoid valve mechanism 4 remains energised. For normal anti-lock operation, the solenoid valve mechanism 4 remains energised for only a short time required to allow the braking pressure to fall sufficiently low for the wheel to reaccelerate. The pump 7 returns displaced fluid from a reservoir 19, into which fluid displaced into said relief connection has passed. This fluid flows into the pressure connection 11 via a return connection 20. As indicated by the broken line 21, the pump 7 can be driven by the wheel 10 e.g., as shown in U.S. Pat. Nos. 3,524,684, issued Aug. 18, 1970 to D.R. Skoyles, or 3,724,914 issued Apr. 3, 1973 to Skoyles. The pump may be the piston type, driven by a cam rotatable with the wheel to be locked as shown in the patents referred to above or any other suitable type known in the art.

When the solenoid valve mechanism 4 is de-energized at the end of the anti-lock period (as determined by the electrical control arrangement 6), the unbalanced valve 13 remains closed for the time being because the spring 16 is not strong enough to push it open against the master cylinder pressure. However, the re-application of braking pressure to the brake 9 commences at a rate controlled by a control valve 22, which is located in a chamber 23 in a by-pass connection across the unbalanced valve 13 between the pressure connections 11 and 12.

If a further anti-lock operation takes place while the unbalanced valve 13 is still closed, then fluid in the pressure connection 12 will be displaced from the brake 9 through the relief connection 14, as before, to relieve braking pressure from the value it had built-up via the control valve 22. If no further anti-lock operation takes place, then the braking pressure will be re-applied at a rate determined by the control valve 22 until the braking pressure is almost equal to the master cylinder pressure. When this condition obtains, the force exerted by the spring 16 will be sufficient to push the unbalanced valve 13 to its open position, which is limited by an end stop 29, so that the pressure connections 11 and 12 are re-connected to re-connect the brake 9 directly to the master cylinder 1.

The control valve 22 is adapted to control the rate at which braking pressure is re-applied in such a manner that this rate increases as the actual value of braking pressure increases. The rate at any instant is proportional to the subsisting braking pressure and independent of the master cylinder pressure. The effect of this control is illustrated in the insert E which shows a curve of braking pressure P against time T. The portion of this curve over the period $t\,0$ to $t\,1$ represents the residual or standing fluid pressure in the system. The portion of the curve over the period $t\,1$ to $t\,2$ represents fluid pressure at the brake due to a braking action. Assuming that an anti-lock operation is initiated at the time $t\,2$, then energization of the solenoid valve mechanism 4 will result in a reduction of fluid pressure at the brake as represented by the portion of the curve subsequent to time $t\,2$. The rate at which fluid pressure at the brake is reduced, can be determined simply by the size of an orifice which is opened by the solenoid valve mechanism 4 to allow fluid to be displaced into the relief connection 14. Other means can be provided for controlling the rate of this fluid pressure reduction, for example as described in co-pending U.S. patent application Ser. No. 154,487, filed June 18, 1971. If braking takes place on a good surface, then the wheel being braked will recover quickly from its tendency to lock, so that fluid pressure at the brake will be reduced to only the value P1, after a short period $t\,2$ to $t\,3$, and then increased again towards locking value. For braking on an intermediate surface, the pressure will fall to a lower value P2 after a larger period $t\,2$ to $t\,4$, before being increased again towards locking value, and for braking on a poor surface, the pressure will fall to an even lower value P3 after an even longer period $t\,2$ to $t\,5$, before being increased again towards locking value. As illustrated by the three curve portions c1, c2, and c3, the rate of increase of fluid pressure (P) at the brake is the same in each portion for any value (e.g., P1) of this pressure, and the rate increases with increase of pressure.

To achieve this control, the control valve 22 is subjected to a reference value of pressure at an area A1 thereof. This pressure is the pressure of fluid in the reservoir 19, and is communicated to the area A1 via a fluid connection 30. This reservoir pressure is maintained substantially constant, due to the action of a spring 25 on a reservoir piston 26, which is displaceable against the spring force to increase the available volume for fluid displaced into the reservoir in accordance with increase of volume of the displaced fluid. An area A2 (= A1) of the control valve is subject to fluid pressure at the brake. The resulting force at A2 is always greater than the force at A1 (due to the reference value of pressure) during braking, so that the force at A2 tends to unseat the control valve from an orifice 27 to allow flow of fluid from the connection 11 to pass via the chamber 23 to the brake 9. When the unbalanced valve 13 is closed, as aforesaid, during anti-lock operation, this is the only path available for flow of fluid from the master cylinder 1 to reach the brake 9. This flow of fluid acts on flow measuring piston area A3 of the control valve 22, to produce a force which aids the force at area A1, and opposes the force at area A2. As the fluid pressure at the brake increases, the force at area A2 increases to progressively open the orifice 27. As the orifice 27 opens, the flow of fluid through it to the brake increases, thereby increasing the force at area A3. Thus, the force at area A3 is continually attempting to balance the force at area A2, and the control valve 22 is progressively displaced from the orifice 27 to increase the flow of fluid which is required for this force balancing. The result is that rate of fluid flow into the brake, and thus the rate of increase of fluid pressure at the brake, is proportional to the braking pressure and independent of master cylinder pressure, provided that braking pressure is less than master cylinder pressure. The reference value of pressure at area A1 simply provides an initial balancing force, and could be provided by atmospheric pressure e.g., by routing connection 30 from area A1 to the atmosphere surrounding the control unit 8, rather than to reservoir 19.

The area A2 is the effective area of the orifice 27 and not the whole of the control valve face, because in practice this face is only a small clearance (e.g., 0.010 inch) from the orifice 27 even when the valve is fully open. The area A2 is required to be substantially the same as the area A1, so that the force at A3, and thus the flow of fluid, stays proportional to the force at A2 minus the force at A1. A spring 28 may be provided which holds the control valve open when the force at A2 becomes equal to the force at A1.

It is envisaged that the unbalanced valve and control valve arrangement in accordance with the invention could also be adapted for use in air brake systems. In such an application, the relief connection 14 would exhaust to atmosphere to dispel air displaced from the brake, and the reference value of pressure would be atmospheric pressure.

What I claim is:

1. An anti-lock vehicle brake system, comprising:
   a brake;
   a source of fluid supplying said brake through a fluid path;
   an unbalanced valve disposed within the fluid path between said fluid source and said brake;
   means defining a relief passage operative between said unbalanced valve and said fluid source, fluid flowing into said relief passage from said brake operative to displace said unbalanced valve from an open fluid path position to a closed fluid path position, so that fluid will cease to flow from said fluid source to said brake;

a solenoid mechanism connected to said relief passage, said solenoid mechanism being activated to unblock said relief passage, allowing fluid to flow from said brake into said relief passage, said unbalanced valve remaining in said closed fluid path position despite subsequent de-energization of said solenoid mechanism and said unbalanced valve remaining in said closed fluid path position until brake pressure increases to a predetermined value relative to the value of fluid source pressure;

means defining a fluid by-pass disposed between said fluid source and said brake and by-passing said unbalanced valve; and a control valve disposed within said by-pass for controlling a rate of increase of brake pressure by regulating a flow of fluid from said fluid source to said brake by way of said by-pass, said control valve progressively increasing the rate of which the brake pressure increases as said brake pressure increases relative to a reference value of pressure.

2. The anti-lock vehicle brake system as claimed in claim 13, wherein said control valve comprises a flow measuring piston which is subjected to flow of fluid from said fluid source which by-passes the unbalanced valve to reach the brake, and the control valve is displaceable towards a fully closed position by means for exerting a force upon said control valve in accordance with said reference value of pressure, and by the force exerted on its flow measuring piston by flow from said fluid source the control valve being also displaceable towards a fully open position by the force exerted on its flow measuring piston by the pressure of fluid at the brake, and the arrangement being such that as the pressure of fluid at the brake increases, the increasing force exerted by this pressure progressively displaces the control valve towards its fully open position, with the result that said flow of fluid progressively increases to produce a progressively increasing balancing force, whereby the rate of increase of braking pressure as caused by the increasing fluid flow is dependent on the value of braking pressure and independent of the value of fluid pressure at the fluid pressure source, when this latter pressure is greater than the braking pressure.

3. The anti-lock vehicle brake system as claimed in claim 2, wherein said control valve is located for its displacement in a chamber with a bap between the chamber wall and the flow measuring piston to permit passage of said flow of fluid past the flow measuring piston.

4. The anti-lock vehicle brake system as claimed in Claim 2, wherein said control valve is located for its displacement in a chamber and its flow measuring piston is formed with at least one hole which permits passage of said flow of fluid through it.

5. The anti-lock vehicle brake system as claimed in claim 2, wherein said control valve is located for its displacement in a chamber and the by-pass is separate from, but communicating with said chamber, on opposite sides of said flow measuring piston permitting passage of said flow of fluid past the flow measuring piston.

6. The anti-lock vehicle brake system as claimed in claim 13, wherein said reference value of pressure is atmospheric pressure.

7. The anti-lock vehicle brake system as claimed in claim 13, further comprising a reservoir connected to said by-pass and said relief passage, said reference value of pressure being the pressure of fluid in said reservoir in to which fluid displaced through said relief passage passes, when the solenoid valve mechanism is energized.

8. The anti-lock vehicle brake system as claimed in claim 7, including a pump disposed in said relief passage for returning fluid in said reservoir to said fluid source.

9. The anti-lock vehicle brake system as claimed in claim 8, wherein said pump is connected to and driven by a vehicle wheel associated with said brake.

10. The anti-lock vehicle brake system as claimed in claim 13, wherein said unbalanced valve is spring-biassed for displacement towards the open position to an extent which is sufficient to hold it open when the solenoid valve mechanism is un-energized, but which is insufficient to maintain it open against a force exerted on a piston of the unbalanced valve by a pressure drop produced across this piston due to flow of fluid past the piston into said relief connection, the spring-biasing of the unbalanced valve also being such, that its force is sufficient to re-open the unbalanced valve only when the brake fluid pressure has increased to almost the value of the fluid source pressure.

* * * * *

PO-1050
(5/69)

UNITED STATES PATENT OFFICE
CERTIFICATE OF CORRECTION

Patent No. 3,801,161            Dated April 2, 1974

Inventor(s) DENIS SHARP

It is certified that error appears in the above-identified patent and that said Letters Patent are hereby corrected as shown below:

Claim 2, line 2, "13" should be --1--

Claim 3, line 3, "bap" should be --gap--

Claim 6, line 2, "13" should be --1--

Claim 7, line 2, "13" should be --1--

Claim 10, line 2, "13" should be --1--

Signed and sealed this 29th day of October 1974.

(SEAL)
Attest:

McCOY M. GIBSON JR.
Attesting Officer

C. MARSHALL DANN
Commissioner of Patents